United States Patent [19]
Ranalli

[11] 3,864,661
[45] Feb. 4, 1975

[54] ULTRASCOPE
[75] Inventor: Ralph Ranalli, Anaheim, Calif.
[73] Assignee: Rohe' Scientific Corporation, Santa Ana, Calif.
[22] Filed: Sept. 10, 1973
[21] Appl. No.: 395,426

[52] U.S. Cl. ................ 340/1 R, 73/67.7, 340/3 C, 343/5 SC
[51] Int. Cl. ........................ G01s 7/56, G01s 7/62
[58] Field of Search ......... 340/1 R, 3 C, 3 R, 5 MP; 315/10–12; 343/5 SC; 73/67.6, 67.7, 67.8 R, 67.8 S, 67.9

[56] References Cited
UNITED STATES PATENTS
3,314,045  4/1967  Williamson et al. .............. 340/3 R Primary Examiner—Richard A. Farley
Attorney, Agent, or Firm—Harris, Kern, Wallen & Tinsley

[57] ABSTRACT

An improved ultrasonic system of the pulse echo type for medical diagnosis and the like. An ultrasonic system providing a visual image with shades of gray, and permitting multiple scans of the body being diagnosed without destroying or overriding the image. An ultrasonic system with transmitter, ultrasonic transducer, receiver and display unit, with a scan converter in the display unit having write, read and erase modes, with the video signal from the receiver connected to the scan converter in the erase mode for image formation by selective erasing.

5 Claims, 2 Drawing Figures

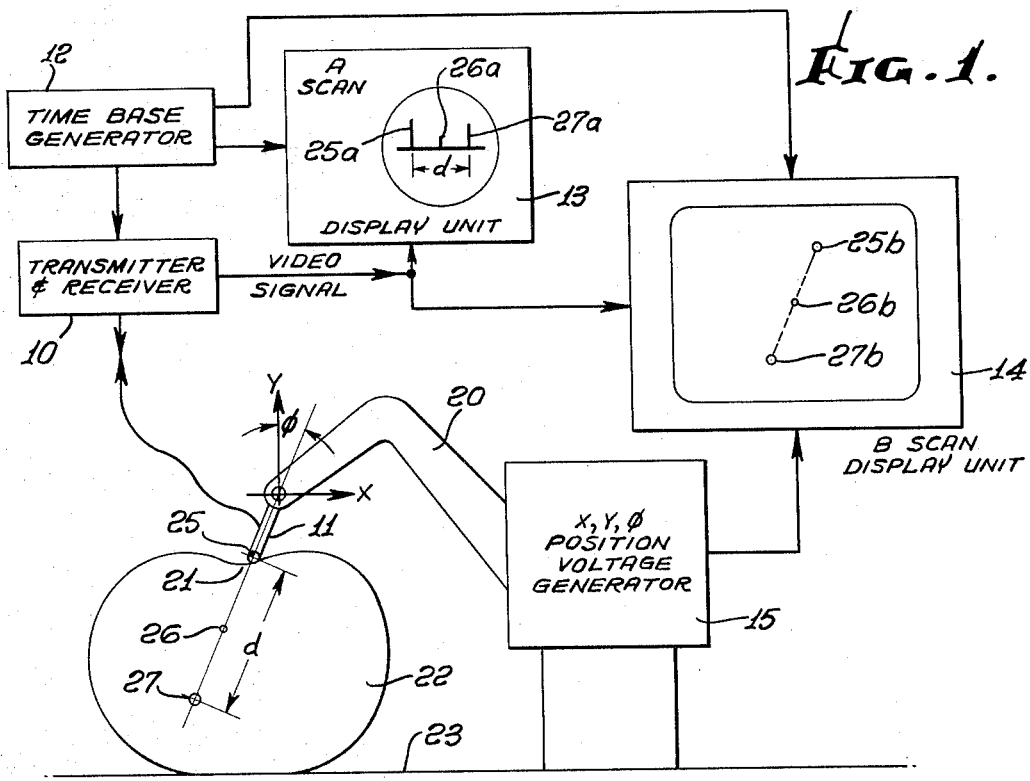

ULTRASCOPE

This invention relates to ultrasonic systems of the pulse echo type which are particularly suited for medical diagnosis and in particular, to a new and improved ultrasonic system which overcomes some of the problems of the conventional system now being used.

Pulse echo ultrasonic signals have been used to identify and discriminate structures within the body for the purposes of medical diagnosis. Existing practice of the art uses display methods developed for radar. Among these are A-scan, which is a graph depicting echo intensity as a vertical deflection against a horizontal base of time of echo return. This time base is usually calibrated to represent target range in distance units. B-scan is also used. This is a spatial diagram where the existence of an echo is represented by a dot at a point in display space representing a mapping of the real position of the target in the scanned plane.

Present day medical ultrasonic systems with B-scan display use bistable storage oscilloscopes to provide a diagram of all echoes whose intensity is above a threshold value. Such images are difficult to interpret and are largely subject to operator scanning technique and threshold setting variability.

Another B-scan display technique available, employs a non-store oscilloscope where dot intensity is a representation of ultrasonic echo intensity. The intensity information is integrated on film through a shutter kept open during the scanning procedure.

The first technique mentioned has a disadvantage in that it gives no echo intensity information and treats all echoes above a given intensity as equal, i.e., and on and off or black and white type display is produced. An advantage is that a scan can be performed without a change in the picture if an area is scanned more than once.

The second technique mentioned above has an advantage in that echoes which are different in intensity will appear different on the screen or film. A disadvantage is that the picture is subject to continuous degratory change if more information is added to the same region on successive sweeps of the scanner arm, particularly if the sweep pattern is irregular or random.

The standard ultrasonic system of the pulse echo type used for medical diagnosis includes transmitter, ultrasonic transducer, receiver and B scan display unit, with the echoes picked up by the transducer presented on the cathode ray tube of a display unit as white spots on a black background. The operator manipulates the transducer to scan a body section during the image formation. One objection is the black and white image produced by the system, it being far preferable to have a resultant picture with shades of gray indicating the intensity of the echoes from various interfaces within the body. Another serious objection is the requirement that the operator have experience and skill in scanning the body so as to avoid over painting or over exposure of any area, since the imaging system is an integrating or summing type system which could produce an all white picture or all white portions of the picture if the body or a portion thereof is scanned repeatedly. One attempted solution incorporates a precisely controlled mechanical scanner for the transducer to limit and equalize the scan for all areas of the body. However this type of device has not been satisfactory because it is slow and expensive and limits the operators technique.

The present invention provides a solution to both the problem of lack of gray scale and the problem of over writing, and produces a vastly improved visual image with shades of gray and one which is not an integrating type so that repeated scanning of the body does not change the image intensity.

The present invention provides a largest value B scan system in the display unit which permits repeated scanning of an area without loss of information due to accumulation and permits discrimination of different ultrasonic pulse echo intensities throughout the scanned plane. This system may use the normal ultrasonic system transmitter, transducer, receiver, time base circuits, transducer scanning mechanics, and display unit, with certain modifications in the display unit. The largest value B-scan display unit is a memory device which has the ability to record for each point, the intensity of the ultrasound pulse echo. It is a property of this memory that if an intensity value already exists at a point, a subsequent equal or lower intensity echo signal at the same point will have no effect. However, when a larger value echo signal is obtained for the point, the recorded value is changed to the larger value.

Other advantages, features and results will more fully appear in the course of the following description. The drawing merely shows and the description merely describes preferred embodiments of the present invention which are given by way of illustration or example.

In the drawing:

FIG. 1 is a block diagram of an ultrasonic system of the pulse echo type incorporating the presently preferred embodiment of the invention; and FIG. 2 is a diagram of the display unit of FIG. 1 illustrating the operation of a storage tube in a scan converter.

The apparatus of FIG. 1 includes a transmitter and receiver 10, an ultrasonic transducer 11, a time base generator 12, an A-scan display unit 13, a B-scan display unit 14, and a position voltage generator 15. All of these components may be conventional and selected from those presently in use, with exceptions to be discussed below.

The transducer 11 is mounted on an arm 20 which in turn is coupled to the generator 15, with the position of the transducer determined in rectangular coordinates $x$ and $y$ and with the directional angle of the transducer determined in the angle $\phi$. In operation, the operator moves the end 21 of the transducer along the surface of the body 22 which may rest on a table 23. The transmitter provides electrical pulses which are converted to ultrasonic pulses by the transducer and launched into the body. Echoes are received from interfaces in the body including the skin at point 25 and other points 26, 27. These echoes are converted to electrical signals by the transducer and sent to the receiver which in turn provides a video signal to the display units.

In the A-scan display unit 13, the height of the pulses 25a, 26a, 27a varies as a function of the strength of the echoes from the points 25, 26, 27, respectively, with the distance between pulses corresponding to the distance between the points in the body. The B-scan display unit 14 provides a map type display where the spots 25b, 26b, 27b have a position corresponding to the points 25, 26, 27, respectively. Further, in the system of the present invention, the spots 25b, 26b, 27b will have an intensity or gray shade corresponding to the amplitude of the echoes from the points 25, 26, 27, respectively.

In the embodiment illustrated, this is achieved by operating the storage tube of the scan converter of the display unit in the erase mode and selectively erasing with the video signal.

FIG. 2 illustrates a typical B-scan display unit with a scan converter 30 and a display cathode ray tube 31. The scanning converter may be a conventional unit, such as the PEP 400 unit of Princeton Electronic Products, Inc. The scan converter includes a storage tube 32 and a typical storage tube is described in U.S. Pat. No. 3,631,294. The display tube 31 may be a conventional TV monitor.

Typically the storage tube 32 includes an envelope 35 cathode 36, control grid 37, accelerating anode 38, wall anode 39, target 40, grid mesh 41, focusing coil 42, and deflecting coil 43.

The scan converter and storage tube are operated in a write mode, a read mode and an erase mode. In the erase mode, all of the stored image is removed from the target 40. In the write mode an image is stored on the target 40 as the electron beam is moved over the target, with the writing signal being applied to the control grid 37. In the read mode, the electron beam is moved over the target in the pattern desired for the display tube, with the read signal developed at the target for coupling to the display tube. The write, read and erase modes are achieved by suitably changing the operating potentials of the unit.

In the present invention, the conventional read mode is utilized for reading stored information from the scan converter to the display monitor. However information is written into or stored in the picture tube in a different mode. In the present invention, the video signal from the receiver is written or stored with the scan converter in the erase mode providing what is known as selective erasing or peak detection writing or maximum value storage. In the embodiment illustrated, the storage tube is first switched to the write mode and a signal from a write signal source 50 is connected to the control grid 37 to fully charge the target 40, that is, to write an all over or solid white picture. Then the unit is switched to the erase mode and the video signal from the receiver is used for the erasing potential in place of the conventional erasing potential. The video signal from the receiver may be connected to the cathode 36 or to the control grid 37. In the preferred embodiment illustrated, the video signal is connected to the cathode for the selective erasing because of the wider dynamic range of the cathode of the particular storage tube utilized.

The target 40 has been fully charged during the write mode. The echo intensity information in the video signal is written onto the target by discharging the target with the erase electron beam. The target when exposed to the erasing beam will only go the charge level produced by the beam. If the same point on the target is again traced by the beam, no change in charge will occur if the beam has the same or lesser signal. A further reduction in charge and hence a further change in visual intensity of the picture at the display tube occurs only when a larger erase beam signal and hence a higher intensity echo is obtained for the particular point. Hence the charge intensity of any point on the storage tube may be varied continuously between the maximum charge value and the minimum charge value, with a corresponding variation in intensity or grayness of the visual image at the display tube.

The scan converter with storage tube provides a readily available and easily modified unit for use in the conventional ultrasonic system to obtain the benefits of the present invention. The storage tube functions as a memory device which records for each point of the scan, the maximum intensity of all of the ultrasonic echoes obtained from the point, without integrating or summing the individual echoes received from the point, that is, the storage tube or memory device stores only the largest value signal received for each point. In an alternative embodiment of the invention, this largest value storage can be obtained with a computer programmed to provide an intensity signal for each point of a display and to compare each new intensity signal for the point with the previously stored intensity signal and to change the stored signal only when the new signal has a greater value.

The ultrasonic system of the present invention produces an image of very high resolution in comparison to existing systems. This occurs because lateral and transverse beam resolution of a transducer is optimally represented since the maximum peak can be distinguished from a lower value from the side of a beam. The new system produces more details in the image, as a structure within the body can be approached from as many surface points and at as many angles as desired, without loss of stored signal amplitude fidelity. The system also produces fewer errors in image formation, as the image reaches a stable, completed stage, and can never be overwritten. Because of the combination of echo amplitude fidelity and high resolution, structures such as small blood vessels become observable and can be demonstrated in any organ including the brain, the liver, the kidney, among others. Because of the combination of echo amplitude fidelity and the ability to access the structures from many directions, organs such as the pancreas, which have previously been very difficult or usually impossible to observe have been reliably depicted.

I claim:

1. In an ultrasonic system having transmitter, ultrasonic transducer, receiver and display unit, said receiver providing a video signal to said display unit, said display unit including a scan converter with storage tube and having write, read and erase modes, the system including in combination a write signal source, means for said connecting said write signal source to said storage tube when in the write mode for writing a solid picture, and means for connecting said receiver video signal to said storage tube when in the erase mode for selective erasing from said solid picture as a function of said video signal.

2. A system as defined in claim 1 wherein said storage tube has a cathode and a writing grid, with said video signal connectible to said cathode.

3. A system as defined in claim 1 wherein said storage tube has a cathode and a writing grid, with said video signal connectible to said writing grid.

4. An ultrasonic system having transmitter, ultrasonic tranducer, receiver and display unit, said receiver providing a video signal to said display unit, said display unit including means for entering an incoming signal into storage, means for reading a storage signal for transmission, and means for erasing a storage signal, the improvement comprising means for connecting said receiver video signal to said display unit erasing means for selectively erasing a storage signal as a function of said video signal.

5. An ultrasonic system having transmitter, ultrasonic transducer, receiver and display unit for providing a visual image of an area scanned by the transducer, said receiver providing a video signal varying in amplitude as a function of the echo intensity from a plurality of points along a plurality of transmission paths in said area, said display unit including storage means providing signal intensity storage for each of said points along each of a plurality of transmission paths in said area, and largest signal means for storing at each of said points of said storage means only the largest of the signals received for the point during the scanning by the transducer.

* * * * *

PO-1050
(5/69)

UNITED STATES PATENT OFFICE
CERTIFICATE OF CORRECTION

Patent No. 3,864,661            Dated February 4, 1975

Inventor(s)            Ralph Ranalli

It is certified that error appears in the above-identified patent and that said Letters Patent are hereby corrected as shown below:

Column 4, line 51 (Claim 1), after "for" delete --said--

Signed and sealed this 6th day of May 1975.

(SEAL)
Attest:

RUTH C. MASON
Attesting Officer

C. MARSHALL DANN
Commissioner of Patents
and Trademarks